UNITED STATES PATENT OFFICE.

ANDREW J. GOODWIN, OF NEW SMYRNA, FLORIDA.

IMPREGNATING WOOD, &c., WITH COPPER.

SPECIFICATION forming part of Letters Patent No. 414,111, dated October 29, 1889.

Application filed August 12, 1889. Serial No. 320,528. (No specimens.)

*To all whom it may concern:*

Be it known that I, ANDREW J. GOODWIN, of New Smyrna, in the county of Volusia, in the State of Florida, have invented a new and useful art or process by which wood or timber of all kinds is rendered perfectly proof against the attacks of all insects, vermin, ship-worms, and germs of vegetation, &c.; and I do hereby declare that the following is a full and exact description of the said art or process, and the materials used therein and manner of use.

The nature of my invention consists in impregnating the wood or logs with a solution of the metal known as "copper," and then precipitating the copper from its solution while in the wood by the chemical action of reagents, thus depositing the metal in the form of its suboxide ($Cu_2O$) or in form of its carbonate ($CuCo_3$) in some woods throughout their whole extent or tissues, thus coppering them. Wood so prepared, when exposed to the action of the air or water of the sea or land, the suboxide of copper contained in it very gradually absorbs oxygen, forming the oxide of copper, which, combining with the carbonic acid of the air, water, or wood, becomes converted into the green carbonate of copper, which is an active poison very sparingly soluble in water. The albumen of the wood is permanently coagulated, rendering it inert, and therefore obnoxious to decay, so that the wood is perfectly protected from the above attacks. Timber so treated, sawed and built into boats or other structures, defies their ravages on land or in water for years, where if otherwise used it will perish in a few weeks or months.

To enable others skilled in the art to make and use my invention, I will proceed to describe its composition and the application of the same.

I compose my copper solution as follows: take of sulphate of copper two ounces; tartrate of soda and potassa, two ounces; water, (rain or river,) one gallon; solution of potash, a sufficient quantity. The solution of potash is made by dissolving one pound of potash in one quart of rain-water. Dissolve the sulphate of copper and the tartrate of soda and potassa in separate parts of the water, then mix them well, and while stirring gradually add the solution of potash until clear and of a greenish color, stopping short of a green precipitate. This clear coppered solution is now to be forced through the pores of the wood by pressure or absorption, when if the wood be recently cut—hard wood, as oak—the grape-sugar or glucose of the wood or its juices will precipitate the red or suboxide of copper from the solution in its passage through the wood and deposit everywhere in it. If green resinous wood, as pine, is treated with the same solution and in same manner, then the mineral copper will be deposited in it in the form of a carbonate in its passage through the wood by the action of the turpentine upon it. If the wood be not recently felled or cut, then the copper solution after being passed into it is allowed to rest from six to twenty-four hours, when a solution of grape-sugar or glucose is to be passed through it to precipitate the copper in the form of its red or suboxide in it.

The solution of grape-sugar is made as follows: take of grape-sugar four ounces; take of water (rain) one gallon, and dissolve the sugar in the water.

Small and thin substances, such as shingles, paper, or cloth, by soaking in the copper solution and then placing in the glucose solution will receive and retain the deposited mineral.

I avoid the defects of previous impregnations—as, for instance, that shown in "Britton on Dry Rot in Timber," by impregnation with copper sulphate, (which is a soluble salt liable to displacement)—by the complete decomposition of the said salt of copper resolving it into an insoluble precipitate of the metal, permanently deposited in the wood or other body treated by my process, as herein specified.

What I claim as my invention, and desire to secure by Letters Patent, is—

In the preservation of wood or other substances by means of the mineral known as "copper," the process of depositing the copper in them by the action of grape-sugar or glucose, which consists in supplying the copper with suitable auxiliary elements in solution, as specified, then by passing said solution through their pores and interstices, and subsequently bringing in contact therewith a solution of grape-sugar or glucose in the proportions specified, all substantially as described.

ANDREW J. GOODWIN.

Witnesses:
FRANK. W. SAMS,
E. T. KING.